(12) United States Patent
Huang et al.

(10) Patent No.: US 8,248,729 B2
(45) Date of Patent: Aug. 21, 2012

(54) SLIDER WITH HOOK-SHAPED AIR COMPRESSION MECHANISMS NEAR TRAILING EDGE CORNERS

(75) Inventors: Weidong Huang, San Jose, CA (US); Robert N. Payne, San Jose, CA (US); Qinghua Zeng, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 686 days.

(21) Appl. No.: 11/601,523

(22) Filed: Nov. 16, 2006

(65) Prior Publication Data

US 2008/0117549 A1  May 22, 2008

(51) Int. Cl.
*G11B 21/21* (2006.01)
*G11B 5/60* (2006.01)
(52) U.S. Cl. ............ 360/235.7; 360/235.9; 360/236.1
(58) Field of Classification Search ............ 360/234.3, 360/235.4–235.5, 235.7–235.9, 236.1, 236.3, 360/236.5–236.8, 237
See application file for complete search history.

(56) References Cited

U.S. PATENT DOCUMENTS

| | | | |
|---|---|---|---|
| 4,475,135 A * | 10/1984 | Warner et al. ............ | 360/236.1 |
| 4,734,803 A * | 3/1988 | Nishihira ................... | 360/236.8 |
| 4,984,114 A | 1/1991 | Takeuchi et al. | |
| 5,097,370 A * | 3/1992 | Hsia .......................... | 360/236.1 |
| 5,196,974 A * | 3/1993 | Higashiya et al. ........ | 360/236.8 |
| 5,550,693 A | 8/1996 | Hendriks et al. | |
| 5,568,981 A * | 10/1996 | Nepela et al. ............. | 360/236.1 |
| 5,777,825 A * | 7/1998 | Dorius ....................... | 360/235.6 |
| 5,986,850 A | 11/1999 | Wang et al. | |
| 6,021,020 A * | 2/2000 | Itoh et al. ................. | 360/236.1 |
| 6,023,394 A * | 2/2000 | Ito et al. ................... | 360/235.7 |
| 6,130,808 A | 10/2000 | Yotsuya | |
| 6,212,032 B1 | 4/2001 | Park et al. | |
| 6,229,671 B1 * | 5/2001 | Boutaghou et al. ....... | 360/236.3 |
| 6,462,909 B1 * | 10/2002 | Boutaghou et al. ....... | 360/235.8 |
| 6,560,071 B2 | 5/2003 | Chapin et al. | |
| 6,587,308 B2 | 7/2003 | Sannino et al. | |
| 6,606,222 B1 | 8/2003 | Ryun | |
| 6,647,612 B1 | 11/2003 | Boutaghou et al. | |
| 6,678,119 B1 | 1/2004 | Pendray et al. | |
| 6,771,468 B1 | 8/2004 | Levi et al. | |
| 6,934,122 B2 | 8/2005 | Boutaghou et al. | |
| 2002/0001157 A1 * | 1/2002 | Kang et al. ................ | 360/236.3 |
| 2002/0060881 A1 * | 5/2002 | Chapin et al. ............. | 360/235.8 |
| 2002/0063995 A1 * | 5/2002 | Sannino et al. ........... | 360/236.3 |
| 2002/0071216 A1 * | 6/2002 | Sannino et al. ........... | 360/236.1 |
| 2002/0075599 A1 * | 6/2002 | Rao et al. .................. | 360/235.7 |
| 2002/0109941 A1 * | 8/2002 | Chapin et al. ............. | 360/235.7 |
| 2002/0135941 A1 * | 9/2002 | Kohira et al. ............. | 360/235.5 |
| 2003/0214756 A1 * | 11/2003 | Yamamoto et al. ....... | 360/236.3 |
| 2004/0012887 A1 * | 1/2004 | Rajakumar et al. ....... | 360/236.2 |
| 2004/0027724 A1 * | 2/2004 | Pendray et al. ........... | 360/236.3 |
| 2004/0090709 A1 * | 5/2004 | Mundt et al. ............. | 360/236.3 |

(Continued)

FOREIGN PATENT DOCUMENTS

JP   01319188 A * 12/1989

(Continued)

*Primary Examiner* — Craig A. Renner

(57) ABSTRACT

Embodiments of the present invention pertain to reducing the probability of a slider contacting a surface of a disk. According to one embodiment, a first etch is performed on the slider. Air compression mechanisms are created near each corner associated with a trailing edge of the slider so that the probability that the corners will contact the surface of the disk is reduced.

9 Claims, 11 Drawing Sheets

U.S. PATENT DOCUMENTS

| | | | |
|---|---|---|---|
| 2004/0120075 A1* | 6/2004 | Rajakumar | 360/235.8 |
| 2005/0047018 A1* | 3/2005 | Takahashi | 360/236.6 |
| 2005/0083609 A1* | 4/2005 | Rajakumar et al. | 360/235.8 |

FOREIGN PATENT DOCUMENTS

| | | | | |
|---|---|---|---|---|
| JP | 03059859 A | * | 3/1991 | |
| JP | 04095214 A | * | 3/1992 | |
| JP | 09198635 A | * | 7/1997 | |
| JP | 10275438 A | * | 10/1998 | |
| JP | 11016141 A | * | 1/1999 | |
| JP | 2001236622 A | * | 8/2001 | |
| JP | 2002050019 A | * | 2/2002 | |

* cited by examiner

| Slider design | Slider 800 | | Slider 300A | | Slider 300B | | Slider 300C | | Slider 200 | |
|---|---|---|---|---|---|---|---|---|---|---|
| Speed\PSA | 1.25 | 2.25 | 1.25 | 2.25 | 1.25 | 2.25 | 1.25 | 2.25 | 1.25 | 2.25 |
| 50 | 0.0259 | 0.03 | 0 | 0 | 0 | 0 | 0 | 0 | 0 | 0 |
| 500 | 0.03 | 0.121 | 0 | 0.001 | 0 | 0 | 0 | 0 | 0 | 0 |
| 1000 | 0.136 | 0.257 | 0 | 0.001 | 0 | 0.009 | 0 | 0 | 0 | 0 |
| 1500 | 0.187 | 0.256 | 0.0001 | 0.02 | 0.001 | 0.038 | 0 | 0.004 | 0 | 0 |

| Slider design | RSA (deg) | -0.8 | -0.4 | 0 | 0.4 | 0.8 |
|---|---|---|---|---|---|---|
| Slider 800 | Loading | 0 | 0 | 0 | 0.0633 | 1.16 |
| | Unloading | 0 | 0 | 0.026 | 0.209 | 0.972 |
| Slider 300A | Loading | 0 | 0 | 0 | 0 | 0.361 |
| | Unloading | 0 | 0 | 0 | 0 | 0.106 |
| Slider 300B | Loading | 0 | 0 | 0 | 0 | 0.515 |
| | Unloading | 0 | 0 | 0 | 0 | 0.111 |
| Slider 300C | Loading | 0 | 0 | 0 | 0 | 0.483 |
| | Unloading | 0 | 0 | 0 | 0 | 0.138 |
| Slider 200 | Loading | 0 | 0 | 0 | 0 | 0.408 |
| | Unloading | 0 | 0 | 0 | 0 | 0.159 |

FIG. 6

SLIDER WITH HOOK-SHAPED AIR COMPRESSION MECHANISMS NEAR TRAILING EDGE CORNERS

TECHNICAL FIELD

Embodiments of the present invention relate to sliders and disk drives. More specifically, embodiments of the present invention relate to reducing the probability of a slider contacting a surface of a disk.

BACKGROUND

Manufacturing disk drives is a very competitive business. Companies that buy disk drives are demanding disk drives that are capable of storing data at ever higher densities. A read write head is used to read data from a disk and to write data to a disk. A slider is typically used to position the read write head over the appropriate location on a disk.

The density that data can be stored on and read from a disk is directly proportional to the height that the slider flies over the disk (also commonly known as "fly height"). For example, the closer that the slider can fly over a disk the more data that can be stored and read from the disk. However, the probability that a slider will come into contact with a disk increases as the fly height decreases. Contact between the slider and the disk can result in permanent damage to the disk. Therefore, there is an increased need to reduce the probability that the slider will come into contact with the disk.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 4 and 5 depict graphed simulation results, according to various embodiments.

FIG. 6 depicts two tables with results from simulating a conventional slider and four sliders according to various embodiments.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

As already stated, the probability that a slider will come into contact with a disk increases as the fly height decreases. This is especially the case at the corners of the trailing edge of a slider since a slider is typically positioned, as will become more evident, so that the trailing edge is closer to a disk's surface than the leading edge. Another factor that increases the likelihood that a slider will come into contact with a disk's surface is the rolling motion of a slider during load and unload processes, as will become more evident.

Therefore, according to one embodiment, air compression mechanisms (ACMs) are associated with each corner of a slider's trailing edge. The rotation of a disk under a slider causes air to move under the slider from the leading edge to the trailing edge. As the air approaches the trailing edge, the air compression mechanisms can trap a certain amount of the air and compress it. The compression of the trapped air can provide a lifting effect thus reducing the probability that the slider's corners will come into contact with the disk's surface.

A Disk Drive

Figure 1:
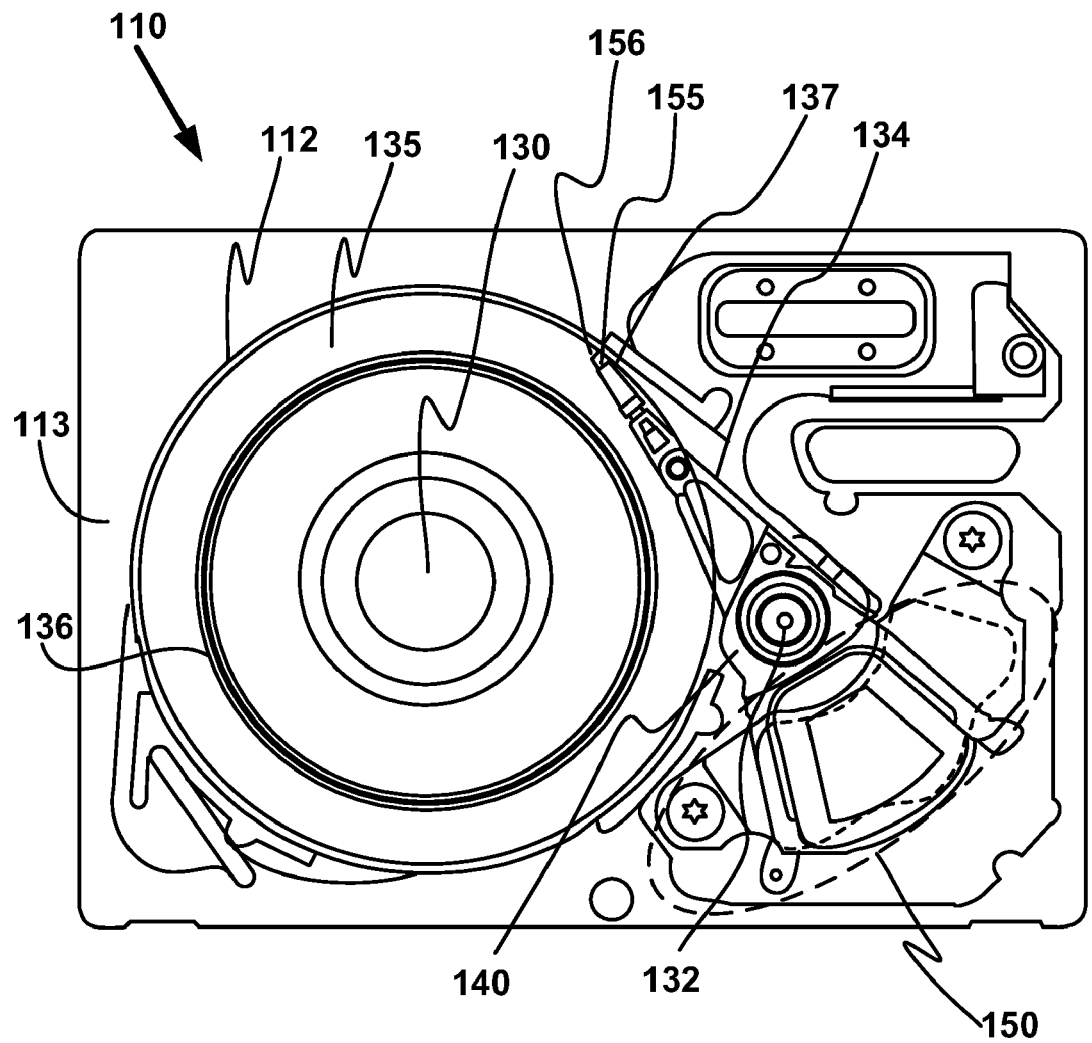
FIG. 1 depicts a plan view of a disk drive for facilitating the discussion of various embodiments of the present invention.

FIG. 1 depicts a plan view of a disk drive for facilitating the discussion of various embodiments of the present invention. The disk drive 110 includes a base casting 113, a motor hub assembly 130, a disk 112, actuator shaft 132, actuator arm 134, suspension assembly 137, a hub 140, voice coil motor 150, a magnetic read write head 156, and a slider 155.

The components are assembled into a base casting 113, which provides attachment and registration points for components and sub assemblies. A plurality of suspension assemblies 137 (one shown) can be attached to the actuator arms 134 (one shown) in the form of a comb. A plurality of transducer heads or sliders 155 (one shown) can be attached respectively to the suspension assemblies 137. Sliders 155 are located proximate to the disk 112's surface 135 for reading and writing data with magnetic heads 156 (one shown). The rotary voice coil motor 150 rotates actuator arms 134 about the actuator shaft 132 in order to move the suspension assemblies 137 to the desired radial position on a disk 112. The actuator shaft 132, hub 140, actuator arms 134, and voice coil motor 150 may be referred to collectively as a rotary actuator assembly.

Data is recorded onto the disk's surface 135 in a pattern of concentric rings known as data tracks 136. The disk's surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Overview of a Conventional Slider and a Conventional Manufacturing Process

Figure 8:
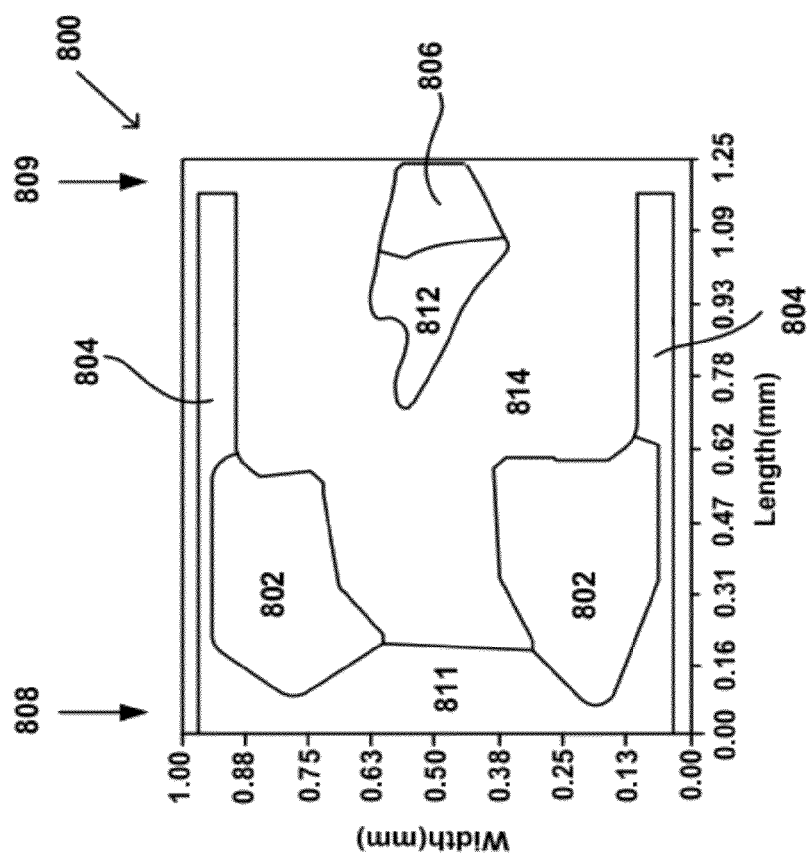
FIG. 8 depicts a topographical view of the bottom of a conventional slider that was manufactured using two etches.

Typically a slider is manufactured using etch processes. A piece of material, such as silicon, is masked and etch processes are applied to the piece of material to remove material from the parts that are not masked. The features of a slider can be created, for example, by etching the piece of material two or more times. FIG. 8 depicts a topographical view of the bottom of a conventional slider 800 that was manufactured using two etches 811 and 812. Areas that were not etched include the ABS pads 802 and part of the element 806. Area 811 represent the area that was etched once, which include the rails 804 and part of the element 806. Area 812 represents the area that was etched twice.

As a disk 112 is rotated, the leading edge 808 of a slider 800 is the first side of the slider 800 to move over a particular location of the disk 112. The trailing edge 809 is the last side of the slider 800 to move over that same location of the disk 112.

Loading and Unloading

One factor that increases the probability that a slider will come into contact with a disk's surface is the load and unload process. When a disk drive is off, the disk 112 associated with the disk drive is not rotating and the slider is "parked," for example, on a ramp that is to the side of the disk 112. When a read or write operation is initiated, the disk 112 begins to rotate. The slider exits its parked position on the ramp and is eventually positioned at a fly height above the disk 112 at which the read/write head 156 can read data from or write data to the disk 112.

The process of moving the slider off the ramp and over the disk is frequently referred to as "loading" the slider or simple as a "load process." When an operation, such as reading or writing data, has been completed, the slider can be parked, for example, on the ramp. The process of parking the slider on the ramp is commonly referred to as "unloading" the slider or simple as an "unload process."

Unloading and loading the slider are critical operations as there is a danger that the read/write heads may come into contact with the disk's surface 135 resulting in damage to the disk's surface 135. For example, as a conventional slider 800 is loaded or unloaded, the suction force created by a conventional slider 800's suction pocket 814 causes the conventional slider 800 to break and to roll around, thus, increasing the probability that the conventional slider 800 will come into contact with the disk's surface 135.

However as will become more evident various embodiments of the present invention provide ACMs to counteract the breaking and rolling phenomenon of a conventional slider 800. For example, the rotation of a disk under a slider causes air to move under the slider from the leading edge to the trailing edge. As the air approaches the trailing edge, the air compression mechanisms can trap a certain amount of the air and compress it. The compression of the trapped air can provide a lifting effect thus reducing the probability that the slider will come into contact with the disk's surface.

Sliders with Reduced Probability of Contacting a Surface of a Disk

Figure 2A:
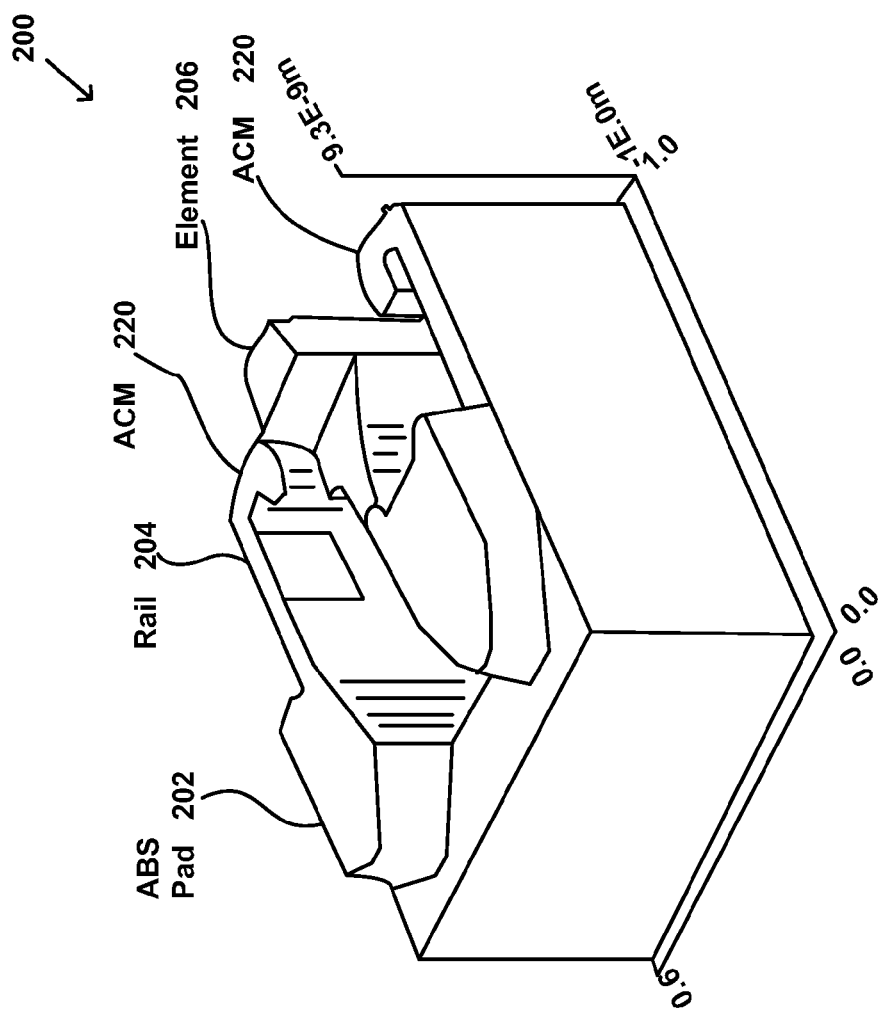
FIG. 2A depicts a three dimensional picture of a slider that has air compression mechanisms, according to one embodiment.

FIG. 2A depicts a three dimensional picture of a slider that has air compression mechanisms (ACMs), according to one embodiment. As depicted in FIG. 2A, the slider 200 has ABS pads 202, rails 204, ACMs 220 positioned near the corners of the trailing edge, and an element 206. The ACMs 220 as depicted in FIG. 2A are hook shaped and are near the a slider's corners at the trailing edge. Thus, as air moves from the leading edge to the trailing edge, a certain amount of the air will be trapped by the ACMs 220 and compressed.

According to one embodiment, two etches can be used to create the features such as ABS pads 202, rails 204, ACMs 220, element 206, suction pocket, etc. For example, no etch is be applied to the areas where the ABS pads 202 are. One etch may be applied to the areas where the rails 204 and the ACMs 220 are. Two etches may be applied to the areas where the suction pocket is. A part of the element 206 may not be etched and the other part of the element 206 may be etched once. Therefore, according to one embodiment the ABS pads 202 would be closest to the disk, the suction pocket would be furthest from the disk, and the rails 204 and the ACMs 220 would be in between the ABS pads 202 and the suction pocket. As can be seen, according to one embodiment, an ACM 220 would be further from the disk than an ABS pad 202.

Figure 2B:
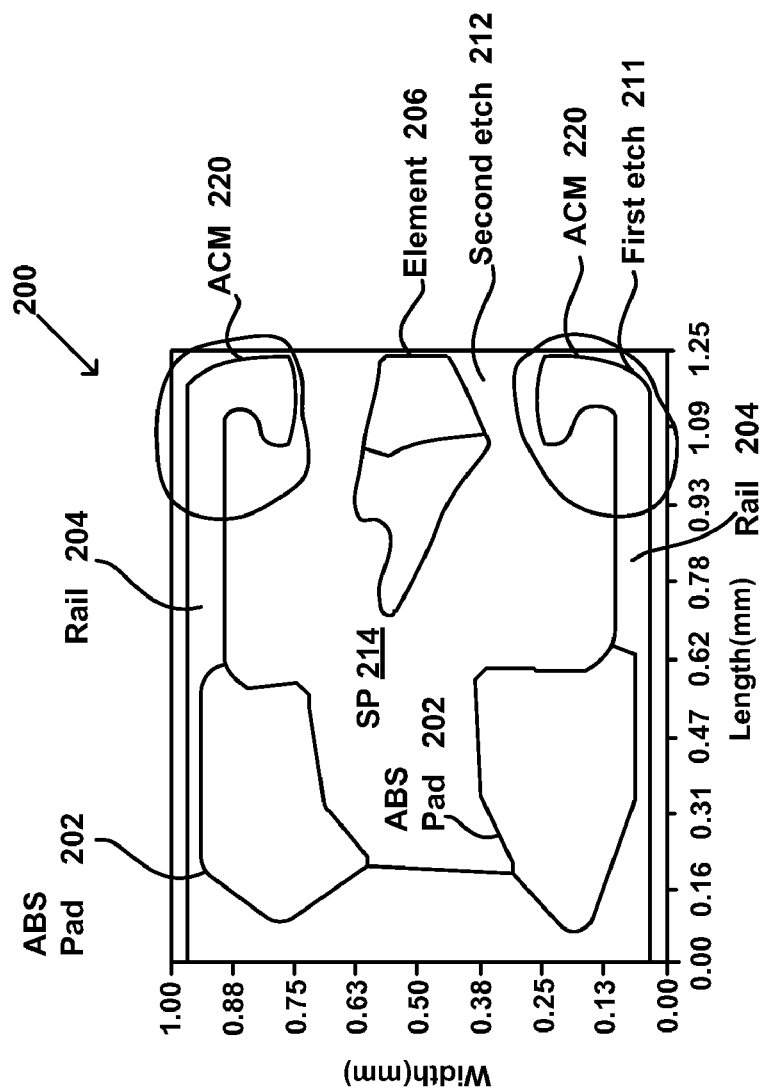
FIG. 2B depicts a topographical view of the slider depicted in FIG. 2A, according to one embodiment.

FIG. 2B depicts a topographical view of the slider 200 depicted in FIG. 2A, according to one embodiment. To continue the illustration, two etches 211 and 212 were applied to the white area 214, one etch 211 was applied to the areas including rails 204 and no etch was applied to the areas including ABS pads 202 and element 206.

Figure 3A:
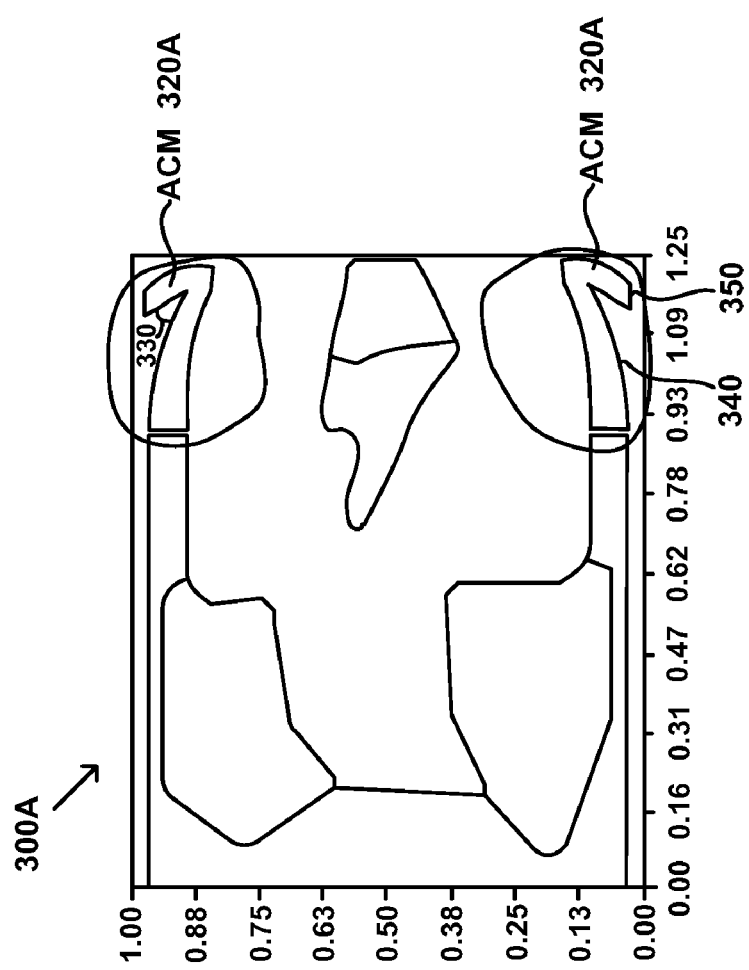
FIGS. 3A-3C depict topographical views of sliders, according to other embodiments.
Figure 3B:
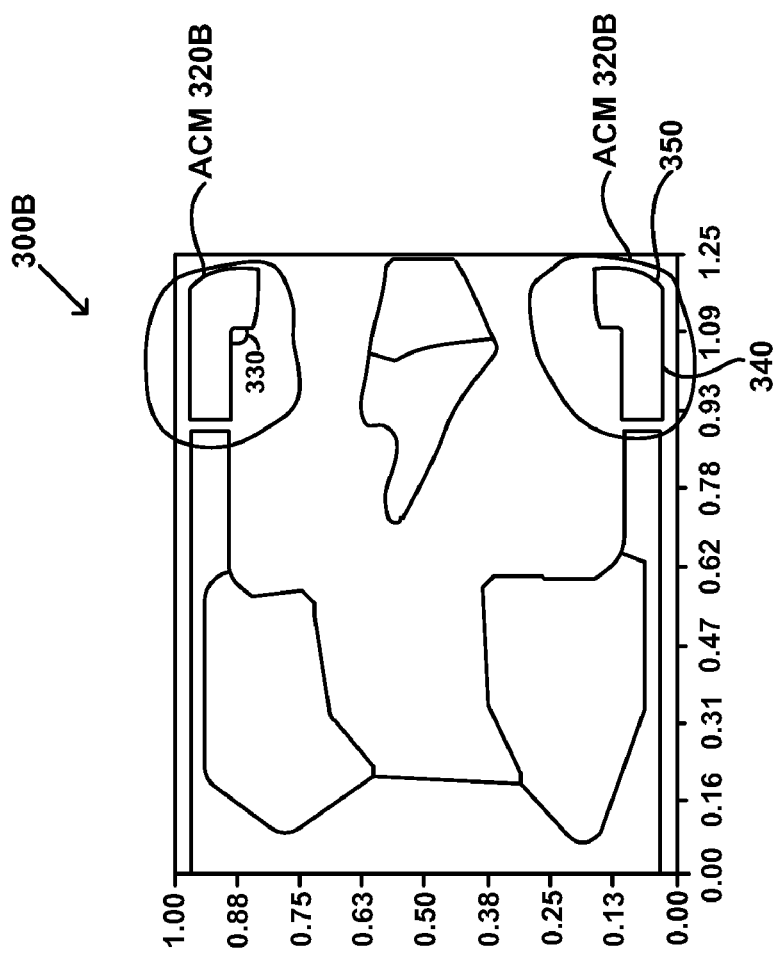
Figure 3C:
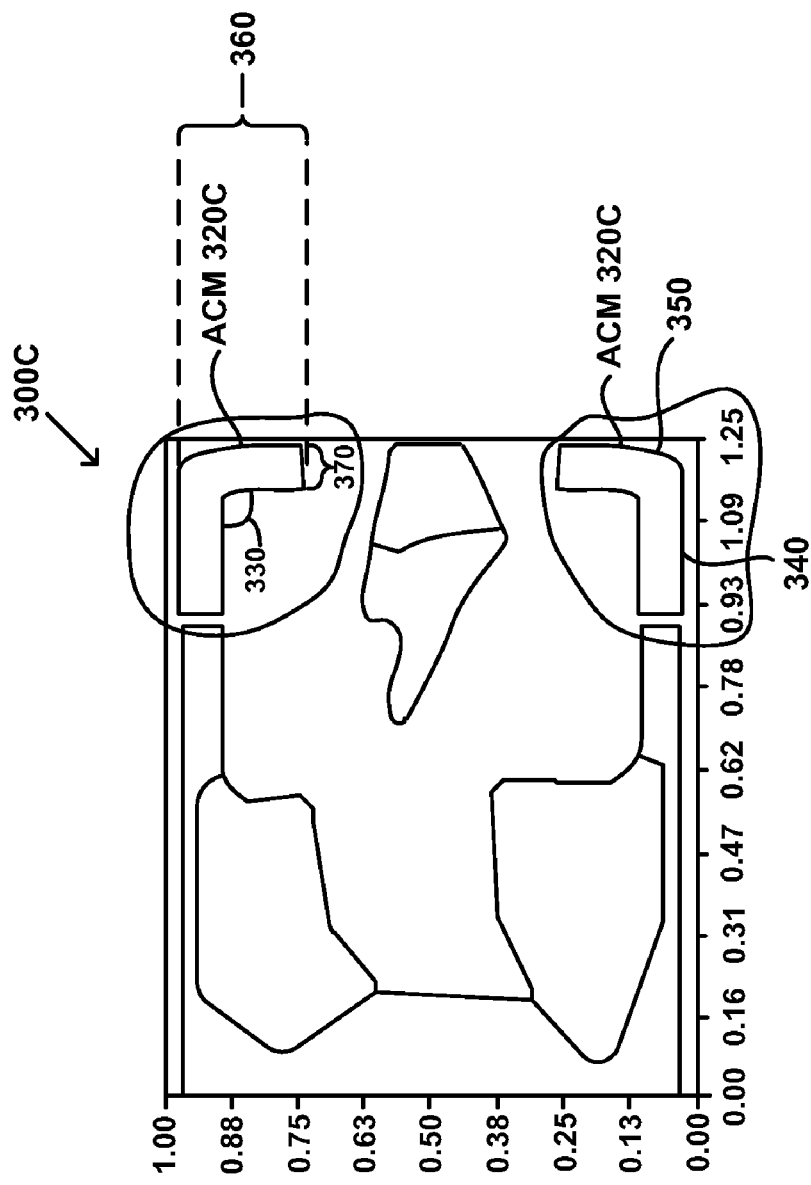

FIGS. 3A-3C depict topographical views of sliders 300A-300C, according to other embodiments. According to one embodiment, an ACM 320A-320C has a first portion 340 and a second portion 350. The first portion 340 may be in alignment with a rail. The second portion 350 of the ACM may form an angle 330 with respect to the second portion 350 of the ACM. As depicted in FIGS. 2A, 2B, 3B and 3C, the ACMs 220, 320B and 320C were formed with the second portion 350 pointing inwards. As depicted in FIG. 3A, the ACMs 320A are formed with the second portion 350 pointing outwards.

FIGS. 3A-3C depict topographical views of sliders 300A-300C, according to other embodiments. According to one embodiment, an ACM 320A-320C has a first portion 340 and a second portion 350. The first portion 340 may be in alignment with a rail. The second portion 350 of the ACM may form an angle 330 with respect to the second portion 350 of the ACM. As depicted in FIG. 2A, 2B, 3B and 3C, the ACMs 220, 320B and 320C were formed with the second portion 350 pointing inwards. As depicted in FIG. 3A, the ACMs 320A are formed with the second portion 350 pointing outwards.

The angle 330 formed by an ACM can vary. For example, according to one embodiment, the angle 330 is 90 degrees or less. According to another embodiment, the angle 330 may vary from approximately 20 to 90 degrees. According to one embodiment, the angle 330 formed by the ACM is small enough to cause air to be compressed, thus, reducing the probability of the slider contacting a disk.

According to one embodiment, an ACM is an extension of a rail. For example, the ACM's first portion 340 may be part of a rail. However, according to another embodiment, the ACM may be separate from a rail. For example, there may be a gap between the ACM's first portion 340 and the rail.

The length 360 and the width 370 of the ACMs can vary as depicted in FIGS. 3B and 3C. The length 360 varies from approximately 12 to 25 microns, according to one embodiment. The width 370 varies from approximately 20 to 100 microns, according to one embodiment, and from approximately 30 to 50 microns, according to another embodiment.

Simulation Results

Figure 4:
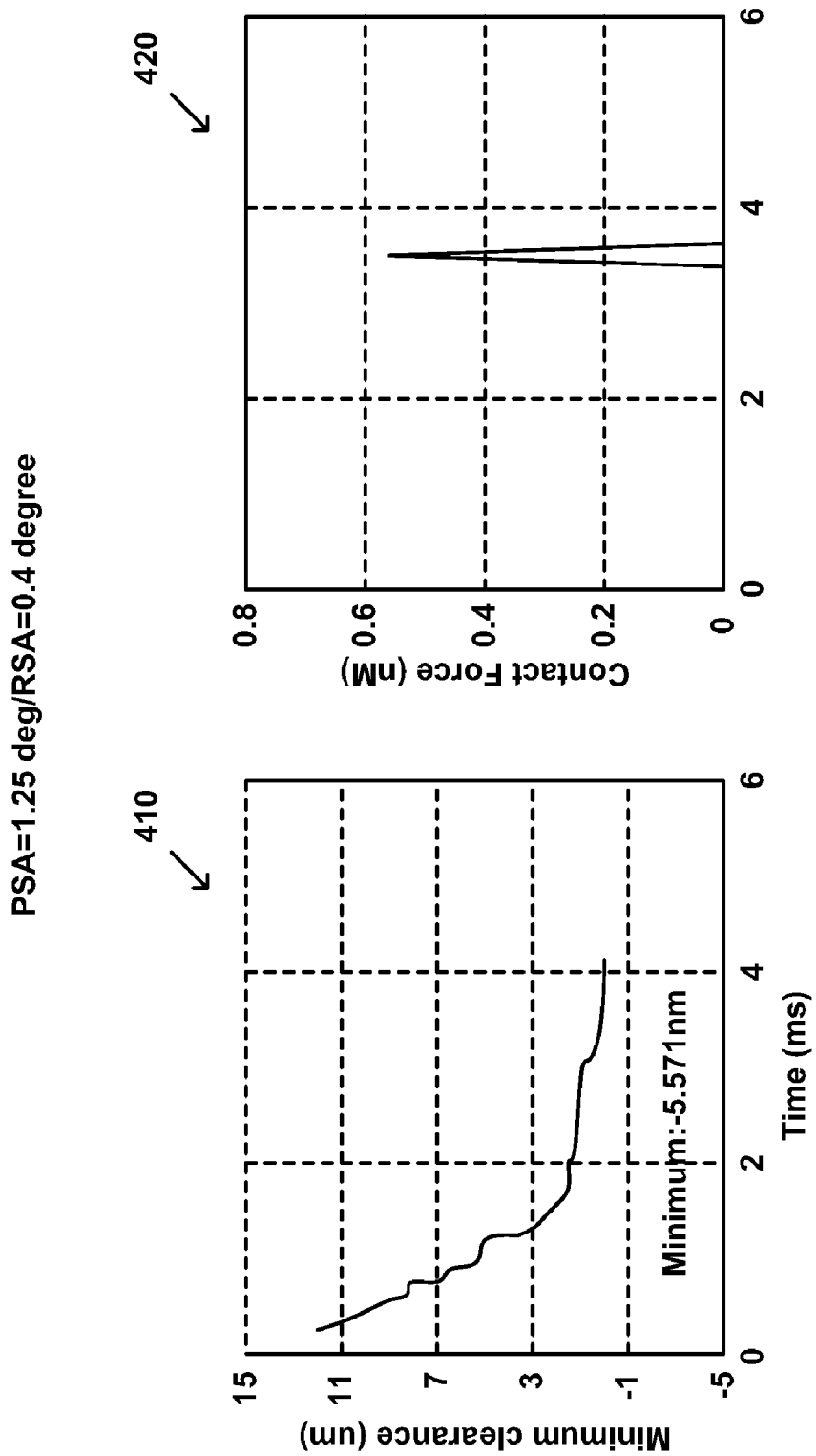

FIGS. 4 and 5 depict graphed simulation results, according to various embodiments. FIG. 4 depicts graphed results from simulating a conventional slider 800 (FIG. 8). FIG. 5 depicts graphed results from simulating a slider 300A (FIG. 3A) according to one embodiment. The simulations were performed assuming that the sliders were being loaded onto a disk and assuming that the respective pitch static attitude (PSA) and roll static attitude (RSA) applied by the suspension arm to the sliders were 1.25 degrees and 0.4 degrees.

The x-axis of graphs 410 and 420 represent time in milliseconds (ms). The y-axis of graph 410 depicts the minimum clearance in microns between the slider and the disk's surface. The y-axis of graph 420 represents contact force in millinewtons (mN).

Referring to graph 420, the conventional slider 800 contacts the disk's surface at approximately 3.5 ms with a force of approximately 5.5 millinewtons. Graph 410 shows that the minimum clearance, due to the conventional slider 800's contact at approximately 3.5 ms, is less than 0. However, referring to graphs 510 and 520, the slider 300A according to one embodiment never contacts the disk's surface.

FIGS. 5 and 6 depict two tables with results from simulating a conventional slider 800 and four sliders 200, 300A, 300B, 300C according to various embodiments. Table 610 depicts the integrated contact force (mN/ms) during unloading with different PSAs and different unloading speeds (millimeters per second). Table 620 depicts the integrated contact force (mN/ms) during loading with different RSAs. The cells with numbers indicate that the respective slider contacted the disk's surface. The cells without numbers indicate that the respective slider did not contact the disk's surface. A larger number in a cell indicates a greater contact force. As can be seen, the sliders according to various embodiments provided reduced probability of contact in comparison with the conventional slider.

Figure 7:
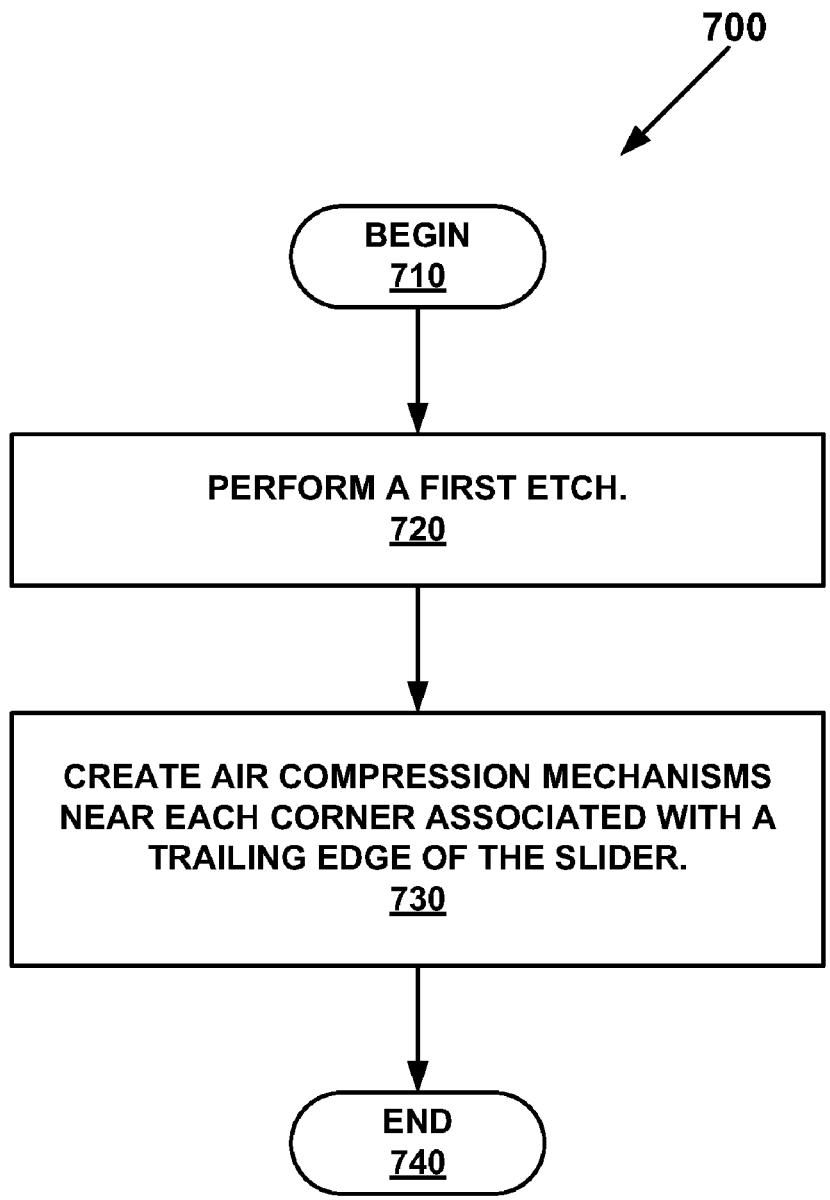
FIG. 7 depicts a flowchart of a method of manufacturing a slider that has a reduced probability of contacting a surface of a disk, according to one embodiment.

A Method of Manufacturing a Slider That has a Reduced Probability of Contacting a Surface of a Disk FIG. 7 depicts a flowchart of a method of manufacturing a slider that has a reduced probability of contacting a surface of a disk, according to one embodiment. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed. The following description of flowchart 700 shall refer to the slider 200 depicted in FIGS. 2A and 2B.

At step 710, the method begins.

At step 720, a first etch is performed on the slider. For example, a piece of material, such as silicon, that a slider 200 can be made out of is masked so that the areas indicated by grey, which includes the ABS pads 202 and part of the element 206, are protected. When the first etch 211 is performed, material is not removed from the areas indicated by grey but is removed from all the other areas as indicated by black and white. Therefore, according to one embodiment, a first etch 211 is performed on the areas that the rails 204 and the ACMs 220 are formed out of. According to one embodiment, the first etch 211 creates the bottom surface of the rails 204 and the ACMs 220. Thus, the bottom of the ACMs 220 and the rails 204 would be on the same level and would be further away from a disk's surface than the ABS pads 202, according to one embodiment.

At step 730, air compression mechanisms are created near each corner associated with a trailing edge of the slider. For example, the areas indicated by grey and black are protected with a mask. When the second etch 212 is performed, material is not removed from the areas indicated by grey and black but are removed from the areas indicated by white. Therefore, according to one embodiment, the suction pocket 214 would be further from the disk's surface than the ABS pads 202, the element 206, the rails 204, and the ACMs 220. According to one embodiment, the second etch 212 creates the sides of the rails 204 and the ACMs 220.

At step 740, the method ends.

As can be seen from the description of flowchart 700, a slider 200, 300A-300C according to various embodiments can be manufactured without requiring more than two etches. Further, according to various embodiments of the present invention, the ACMs 220, 320A-320C as depicted in FIGS. 2A, 2B, 3A-3C trap and compress a certain amount of the air that flows from the leading edge to the trailing edge, thus, reducing the probability that a slider 200, 300A-300C will come into contact with a disk's surface.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A slider with reduced probability of contacting a surface of a disk, the slider comprising:
    an air bearing surface closer to the surface of the disk than air compression mechanisms, the air bearing surface being etched less than the air compression mechanisms;
    a suction pocket positioned between and running alongside the air compression mechanisms; and
    said air compression mechanisms near each corner associated with a trailing edge of the slider so that the probability that corners will contact the surface of the disk is reduced, each air compression mechanism having a hook shape with only a single tip portion, said tip portion pointing outwards, wherein the shape of each air compression mechanism forms an angle that is 90 degrees or less, wherein the air compression mechanisms trap and compress a portion of air to provide a lifting effect thereby reducing slider contact with the disk's surface.

2. The slider of claim 1, wherein more than two etches are not required to manufacture the slider.

3. The slider of claim 1, wherein at least a portion of the air compression mechanisms has a thickness that ranges from approximately 20 to 100 microns.

4. The slider of claim 3, wherein the thickness ranges from approximately 30 to 50 microns.

5. The slider of claim 1, wherein the angle is approximately 20 to 90 degrees.

6. A slider with reduced probability of contacting a surface of a disk, the slider comprising:
- an air bearing surface closer to the surface of the disk than air compression mechanisms, the air bearing surface being etched less than the air compression mechanisms; and
- said air compression mechanisms associated with a trailing edge of the slider so that the probability that corners associated with the slider will contact the surface of the disk is reduced, such that the leading edge of each air compression mechanism is not in contact with the leading edge of an adjacent air compression mechanism, each air compression mechanism having a hook shape with only a single tip portion, said tip portion pointing outwards, wherein the shape of each air compression mechanism forms an angle that is 90 degrees or less, wherein the air compression mechanisms trap and compress a portion of air to provide a lifting effect thereby reducing slider contact with the disk's surface.

7. The slider of claim 6, wherein the air compression mechanisms are near the corners associated with the slider.

8. The slider of claim 6, wherein the tip portion of each air compression mechanism is a part of rails associated with the slider.

9. The slider of claim 6, wherein at least a portion of the air compression mechanisms has a thickness that ranges from approximately 20 to 100 microns.

* * * * *